(12) United States Patent
Cortinovis et al.

(10) Patent No.: US 7,703,582 B2
(45) Date of Patent: Apr. 27, 2010

(54) DEVICE FOR ADJUSTING A DUAL-SERVO DRUM BRAKE WITH INTERNAL SHOES

(75) Inventors: Gianpaolo Cortinovis, Dalmine (IT); Maurizio Mascheretti, Lallio (IT)

(73) Assignee: Freni Brembo S.p.A., Curno (IT)

( * ) Notice: Subject to any disclaimer, the term of this patent is extended or adjusted under 35 U.S.C. 154(b) by 0 days.

(21) Appl. No.: 10/496,676

(22) PCT Filed: Nov. 27, 2001

(86) PCT No.: PCT/IT01/00598

§ 371 (c)(1),
(2), (4) Date: May 26, 2004

(87) PCT Pub. No.: WO03/046400

PCT Pub. Date: Jun. 5, 2003

(65) Prior Publication Data

US 2005/0090730 A1 Apr. 28, 2005
US 2006/0122479 A9 Jun. 8, 2006

(51) Int. Cl.
*F16D 51/00* (2006.01)
(52) U.S. Cl. ................................. 188/79.61
(58) Field of Classification Search ............... 188/79.61
See application file for complete search history.

(56) References Cited

U.S. PATENT DOCUMENTS

| | | | | |
|---|---|---|---|---|
| 1,921,287 A * | 8/1933 | Farkas | ................ | 188/79.61 |
| 2,036,385 A * | 4/1936 | Maxime | ................ | 188/325 |
| 2,045,010 A * | 6/1936 | Goepfrich | ................ | 188/79.61 |
| 2,060,877 A | 11/1936 | La Brie | | |
| 2,093,931 A * | 9/1937 | Sawtelle | ................ | 188/79.61 |
| 2,095,034 A * | 10/1937 | Main et al. | ................ | 188/79.61 |
| 2,109,013 A * | 2/1938 | Main et al. | ................ | 188/79.61 |
| 2,126,685 A * | 8/1938 | Main | ................ | 188/79.61 |
| 2,139,345 A * | 12/1938 | Babineau | ................ | 188/79.61 |
| 2,146,207 A * | 2/1939 | Farkas | ................ | 188/79.61 |
| 2,148,240 A * | 2/1939 | La Brie | ................ | 188/368 |
| 2,151,557 A * | 3/1939 | Main | ................ | 188/79.61 |

(Continued)

FOREIGN PATENT DOCUMENTS

FR    1 069 251    7/1954

(Continued)

*Primary Examiner*—Bradley T King
(74) *Attorney, Agent, or Firm*—Hogan & Hartson

(57) ABSTRACT

A device for adjusting a dual-servo brake with internal shoes (9) being supported on a shoe-holder plate (2) so as perform floating selfreinforcing or automatic activation movements against a braking surface of a drum. The device comprises: adjustment elements (30) comprising thrust surfaces (31) cooperating with opposed counter-thrust surfaces (32) of a pyramidal end of an actuation elements (34) provided with a threaded portion (35) housed rotatably in a threaded through-hole (36) of a support element (37), the threaded through-hole being arranged substantially along an axis transverse the axis of the mutual separation or approach movement of the ends of the shoes, the support element further comprising support means (38) for housing the adjustement elements slidably so as to form, with the actuation element, a support ans thrust structure closed onto the opposed adjustment elements, the actuation element further comprising an operating extension which can be housed so as to float freely in a slot provided in the shoe-holder plate so that an activation end (41) projects from the brake.

18 Claims, 8 Drawing Sheets

U.S. PATENT DOCUMENTS

| | | | | |
|---|---|---|---|---|
| 2,154,031 A | * | 4/1939 | Bunting | 446/202 |
| 2,157,091 A | * | 5/1939 | Baisch | 188/79.61 |
| 2,161,900 A | * | 6/1939 | Main | 188/79.61 |
| 2,161,903 A | * | 6/1939 | Sawtelle | 188/327 |
| 2,183,432 A | * | 12/1939 | Reynolds | 188/79.61 |
| 2,185,434 A | * | 1/1940 | Goepfrich | 188/79.61 |
| 2,189,014 A | * | 2/1940 | Main | 188/79.61 |
| 2,190,978 A | * | 2/1940 | Dick | 188/78 |
| 2,191,677 A | * | 2/1940 | Nickell | 188/79.61 |
| 2,193,975 A | * | 3/1940 | Main | 188/327 |
| 2,193,985 A | * | 3/1940 | Sawtelle | 188/331 |
| 2,198,878 A | * | 4/1940 | Main | 188/79.61 |
| 2,207,172 A | * | 7/1940 | Goepfrich | 188/79.61 |
| 2,255,989 A | * | 9/1941 | Sinclair | 188/331 |
| 2,259,074 A | * | 10/1941 | Main | 188/79.61 |
| 2,259,075 A | * | 10/1941 | Main | 188/79.61 |
| 2,271,815 A | * | 2/1942 | Cowell | 188/78 |
| 2,372,319 A | * | 3/1945 | Francois | 8/127.6 |
| 2,372,415 A | * | 3/1945 | Eksergian | 244/214 |
| 2,376,686 A | * | 5/1945 | Goepfrich | 422/119 |
| 2,490,135 A | * | 12/1949 | Jenkins | 188/368 |
| 3,113,466 A | * | 12/1963 | Osborne | 74/110 |
| 3,977,500 A | * | 8/1976 | Farr | 188/106 A |
| 4,394,892 A | * | 7/1983 | Mizusawa et al. | 188/196 BA |
| 4,494,633 A | * | 1/1985 | Idesawa | 188/329 |
| 5,076,402 A | * | 12/1991 | Schefcsik et al. | 188/196 M |

FOREIGN PATENT DOCUMENTS

GB    951381    3/1964

* cited by examiner

DEVICE FOR ADJUSTING A DUAL-SERVO DRUM BRAKE WITH INTERNAL SHOES

The subject of the present invention is a device for adjusting a dual-servo drum brake with internal shoes [a self-energizing or duo/dual-servo brake].

Brakes of this dual-servo type are described, for example, in DE-485 688, U.S. Pat. No. 6,131,711 and U.S. Pat. No. 6,302,245.

These known dual-servo brakes with internal shoes are capable of producing a large braking force by virtue of the provision of shoes which can perform movements such as to give rise to an automatic activation of the brake. This efficient braking action is also known as self-energizing action or auto-expansion movement of the shoes and is achieved mainly by virtue of the provision of shoes which are supported so as to float freely on a shoe-holder plate.

In these dual-servo brakes, first ends of the shoes cooperate with a separator device which, during the braking operation, moves these ends away from an abutment element which projects from the shoe-holder plate and is disposed between the opposed activation ends of the shoes. As the shoes move apart, they pivot about their opposite ends, between which a spacer is disposed. As the operation continues, the shoe train widens radially, bringing the friction material which is present on the shoes into contact with the braking surface of the drum. At this point, the drum tends to rotate the shoe train into abutment with the abutment element. Any further action of the separator device and/or of the drum tends to "wedge" the shoe train against the braking surface of the drum and into abutment with the abutment element to an ever greater extent.

In order to distribute the braking force uniformly on the braking surface even with increasing wear of the friction material, it is known to interpose an adjustable spacer between the ends of the shoes remote from those which cooperate with the separator device.

An example of these devices is described in U.S. Pat No. 5,076,402.

Although these known devices afford the shoes the freedom of movement necessary to achieve the automatic activation or floating-shoe movement, they are also imprecise because they are difficult to adjust. In fact, in order to perform the necessary adjustments of the relative spacing of the ends of the shoes, it is necessary to insert a screwdriver into the brake until the end of the screwdriver is coupled with the drive slot of a grub screw which, when rotated, can pivot the levers which move the above-mentioned opposed ends of the shoes apart or towards one another.

In particular, in order to adjust the relative distance between the ends of the shoes to compensate for wear of the friction material, there is a great need to provide a highly reliable and accurate device which at the same time is of simple construction and easy to use.

Attempts to fulfil this need have already been made in the past but solutions have been found only for drum brakes having non-floating shoes, and these solutions are not satisfactory.

Examples of adjustment devices for non-floating (or non dual-servo) shoes are described in the patents U.S. Pat. No. 5,456,338, GB-777,589, GB-565,088 and GB-951,381.

The problem underlying the present invention is that of proposing a device for adjusting a dual-servo brake with internal shoes which has structural and functional characteristics such as to overcome the disadvantages mentioned above with reference to the prior art.

This problem is solved by means of a device for adjusting a dual-servo drum brake with internal shoes as described in claim 1, as well as by a drum brake as described in claim 27.

Further embodiments are described in the dependent claims.

Further characteristics and the advantages of the adjustment device according to the invention will become clear from the following description of a preferred embodiment thereof, provided by way of non-limiting example with reference to the appended drawings, in which.

With reference to the above-mentioned drawings, a unit comprising elements of a disk service brake and of a drum parking brake is generally indicated 1. In particular, the unit comprises a shoe-holder plate 2 suitable for supporting a caliper, not shown, of the disk service brake and also for supporting the non-rotating components of the drum parking brake.

"Service brake" is intended to define a brake which can slow down or stop, for example, a moving axle or shaft of a vehicle, whereas "parking brake" is intended to define a brake suitable for keeping, for example, an axle or a shaft of a vehicle locked when it is not in motion.

The non-limiting embodiment described below is a dual-servo drum parking brake but the present invention may equally well be applied to a dual-servo drum service brake.

Figure 1:
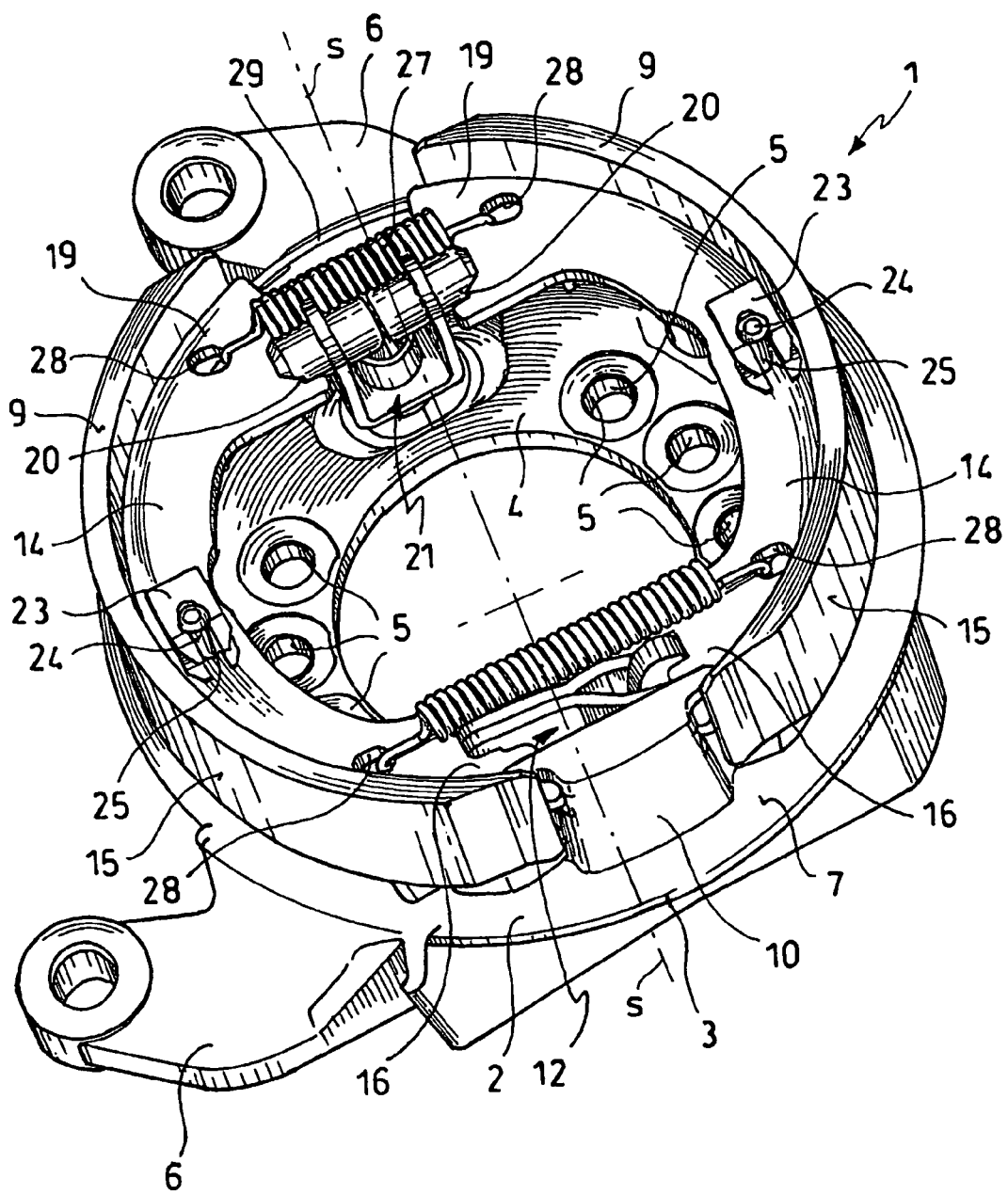
FIG. 1 is a perspective view of a dual-servo drum brake, without the drum.
Figure 2:
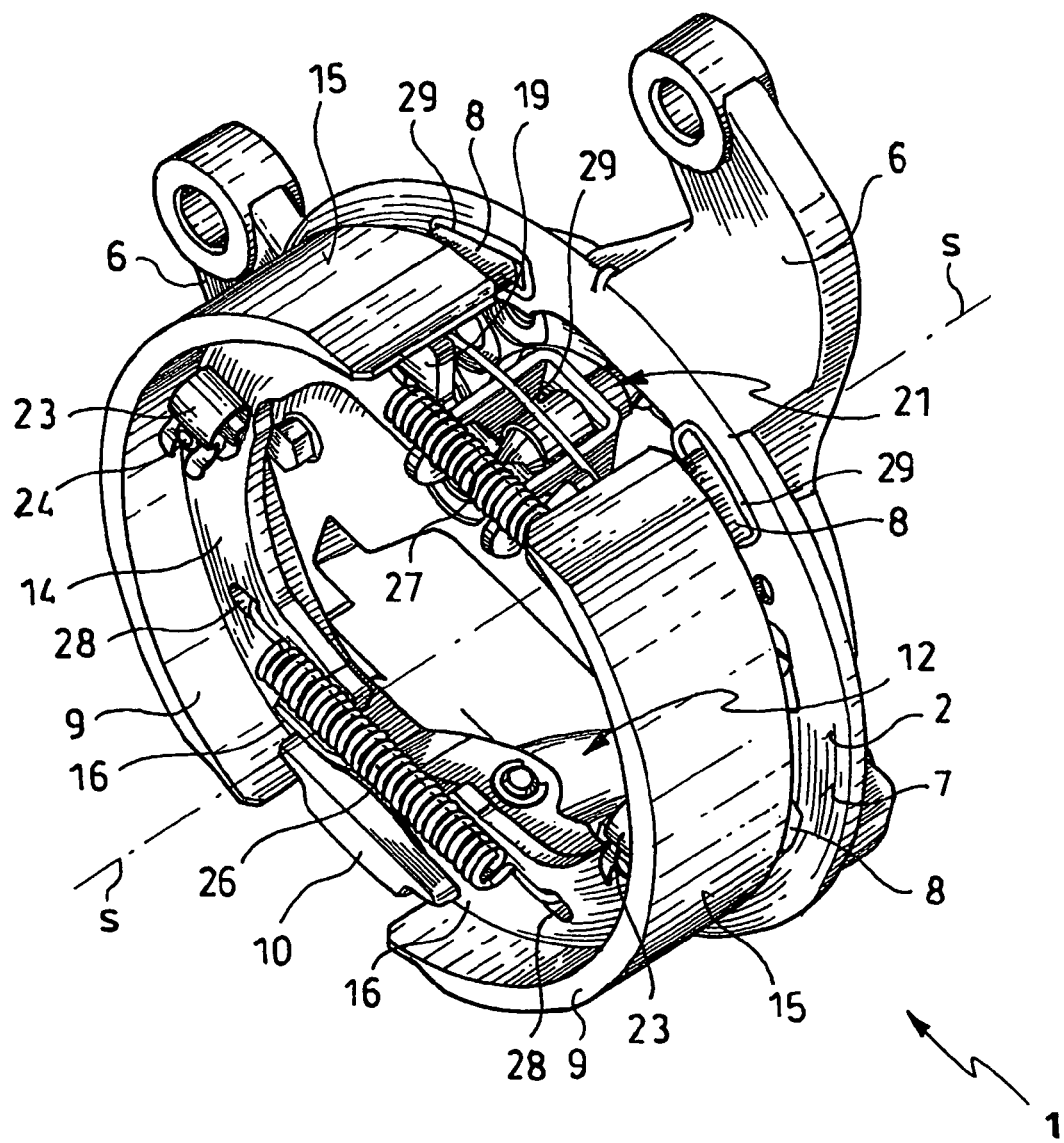
FIG. 2 is a further perspective view of the brake of FIG. 1.
Figure 3:
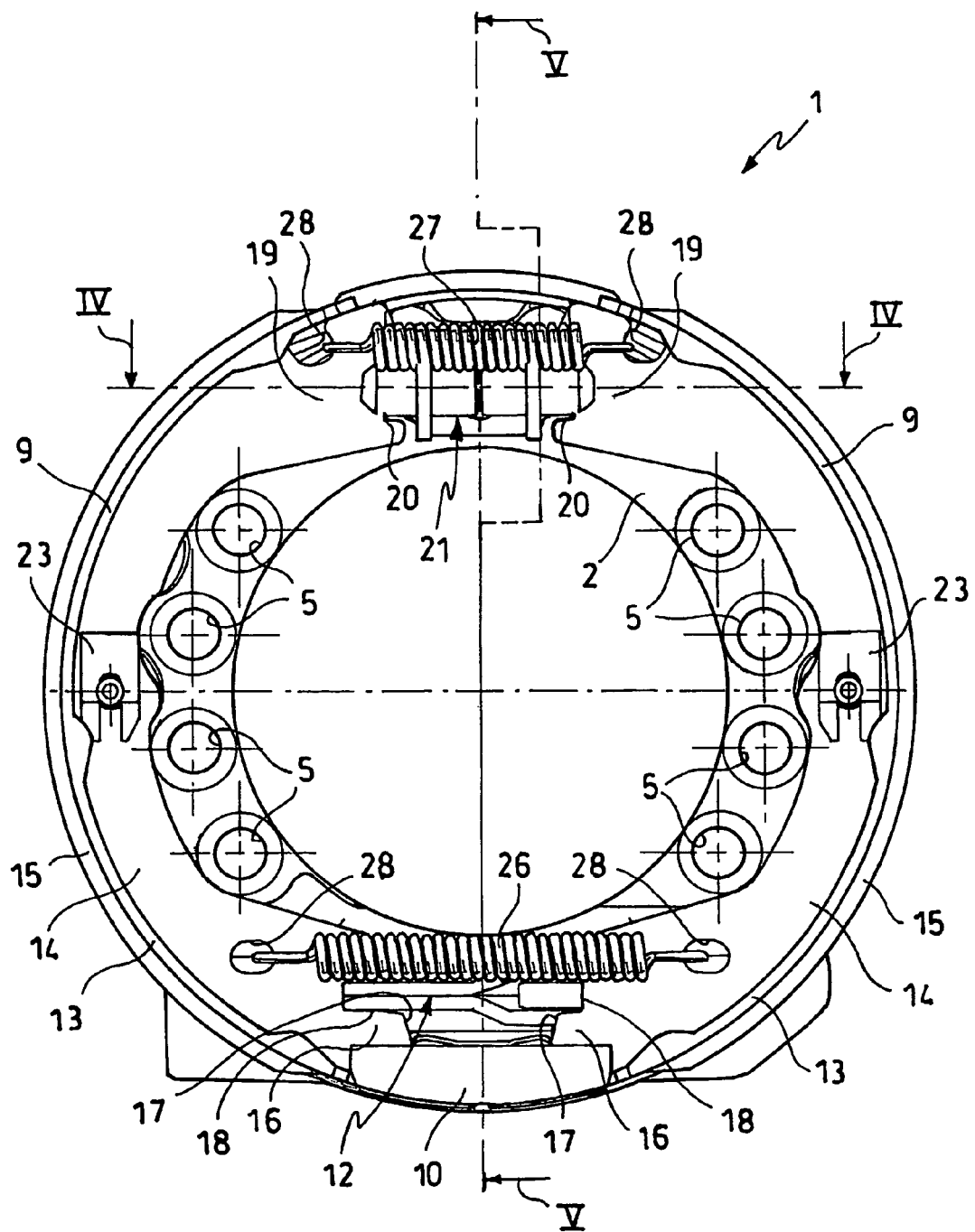
FIG. 3 is a front view of the brake of FIG. 1.

The shoe-holder plate 2 is substantially toroidal, with an outer surface 3. The plate comprises, internally, a flange-shaped portion 4 for fixing to an axle of a vehicle. The flange 4 has a plurality of holes 5, preferably eight holes (FIG. 3) disposed along arcs of a circle and diametrically opposed in pairs with respect to the axis s-s of the braking surface or brake axis (FIGS. 1 and 2). Substantially radial projections 6 for the fixing of the caliper extend outwardly from the outer surface 3. The shoe-holder plate 2 has, on its surface 7 which faces outwardly relative to the vehicle when installed, a plurality of projections 8, preferably six projections, arranged along arcs of a circle, diametrically opposed in pairs with respect to the axis s-s of the brake and, according to one embodiment, aligned with two of the fixing holes 5. Shoes 9 can bear on these projections 8. The shoe-holder plate has an abutment element 10 circumferentially spaced from the holes and from the projections, for the discharge of the braking stress. In the vicinity of the abutment element, there is an opening 11 (FIG. 5), for example, a substantially rectangular opening, suitable for housing an actuator device, for example, a shoe-separator or spreader device, generally indicated 12. For example, the actuator is a lever actuator of known type which can separate the shoes at one end in order to bring them into contact with the braking surface of the drum (not shown).

Figure 5:
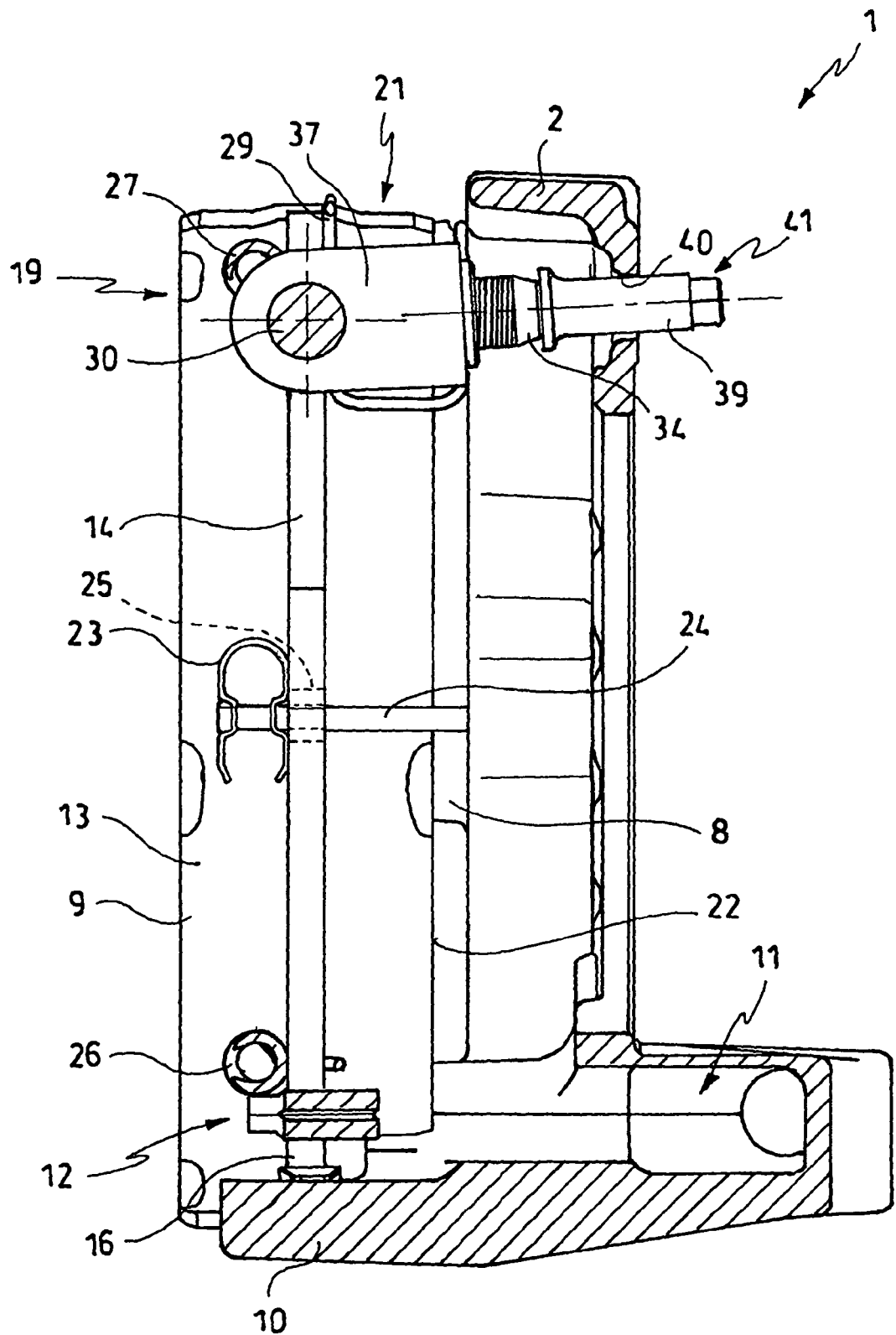
FIG. 5 is a section through the brake of FIG. 1, taken on the arrows V-V of FIG. 3.
Figure 6:
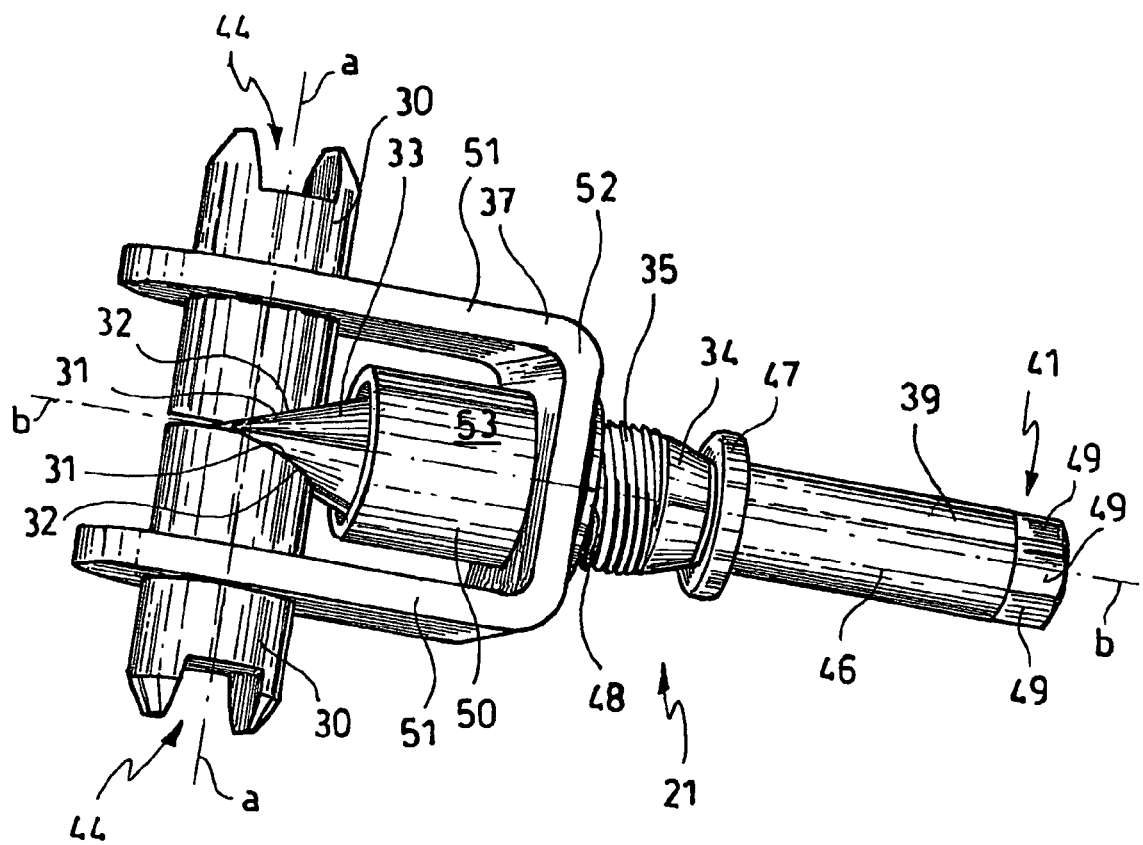
FIG. 6 is a perspective view of an adjustment device.

Each shoe 9 comprises a plate 13 shaped as an arc of a circle and reinforced by a flat rib 14, for example, disposed centrally relative to the depth of the shoe. Each plate 13 is provided with friction material 15 suitable for contacting the braking surface of the drum in order to exert the required braking force (FIG. 5). Each rib 14 has, at an end 16, a bearing surface 17 suitable for abutting the abutment element 10 in order to discharge the braking stress. The end 16 also has a seat 18 for housing the actuator 12. Each rib 14 has, at its end 19 remote from the actuator 12, a seat 20 for coupling with an adjustment device, generally indicated 21, which, amongst other things, acts as a spacer between the two ends 19 of the floating shoes 9.

The shoes 9 are arranged opposite one another with edges 22 of the plates 13, and possibly of the friction material, arranged bearing on the plurality of projections 8 (FIG. 5). The shoes are held in position axially by resilient means 23, one for each shoe, associated with a corresponding number of pins 24 fixed axially to the shoe-holder plate 2. The shoes 9 are restrained purely on the resilient means, for example, flexion spring-like members, and do not come into contact with the respective pins 24 during their movement, by virtue of the fact that each pin is housed freely in a slot 25 provided in the rib 14 of the shoe.

The shoes 9 are constantly urged towards one another by resilient elements 26 and 27 disposed at the two ends 16 and 19, respectively, and engaged in suitable holes 28 provided in the ribs 14, so that the ends are constantly in abutment with the actuator 12 and with the adjustment device 21, respectively.

A further resilient means, for example, a wire spring 29, constantly urges the shoes 9 away from the abutment element 10. The action of this spring and the frictional force produced between the shoes and the projections prevent the shoes from moving towards the surface of the drum as a result of the stresses and/or vibrations produced during the movement of the vehicle and under their own weight. For example, the wire spring has its ends wrapped around two projections 8 remote from the actuator 12 and has an arcuate portion which abuts the angle formed between the rib and the plate of each shoe, urging it away from the drum and/or from the abutment element in a radial direction so as to compensate for the effect of the stresses, the vibrations, and the weight of the shoes.

The actuator 12, a first shoe 9, the adjustment device 21 acting as a spacer, and the second shoe 9 form a kinematic train or chain which abuts the abutment element 10 during the braking operation.

Figure 4:
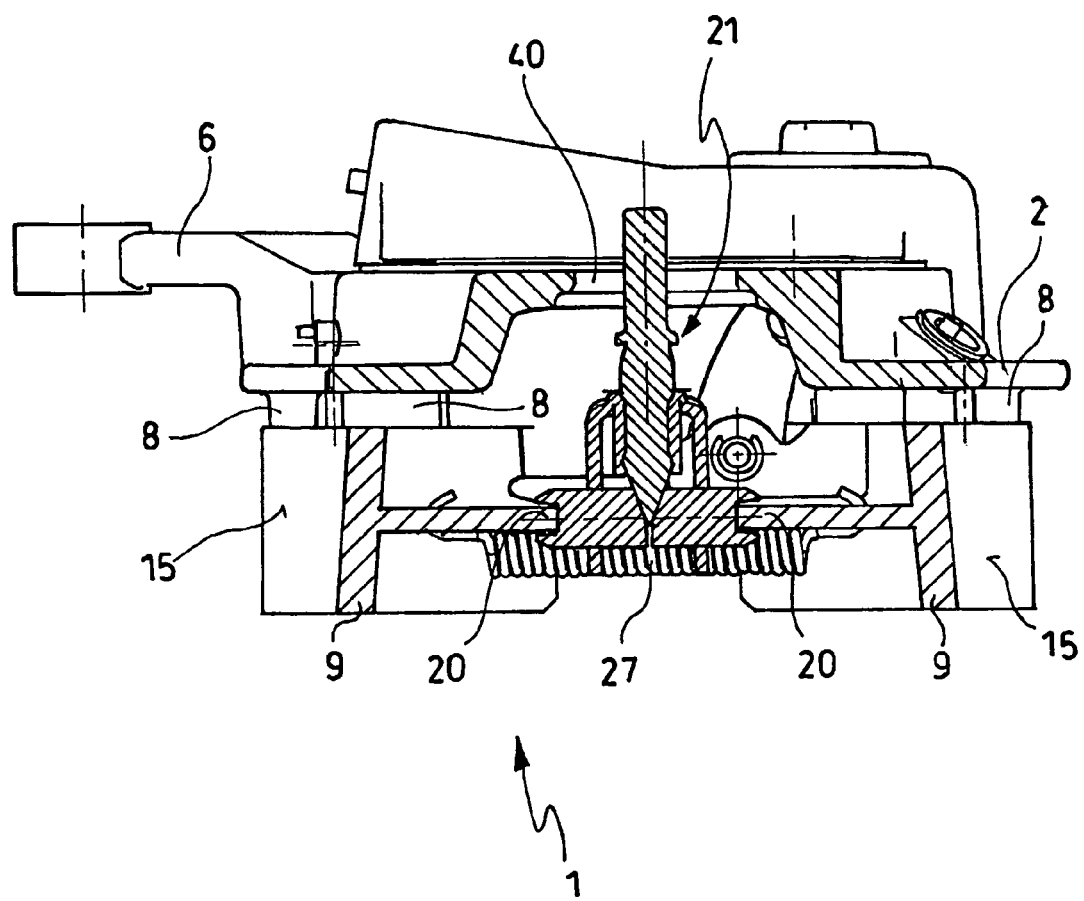
FIG. 4 is a section through the brake of FIG. 1, taken on the arrows IV-IV of FIG. 3.
Figure 7:
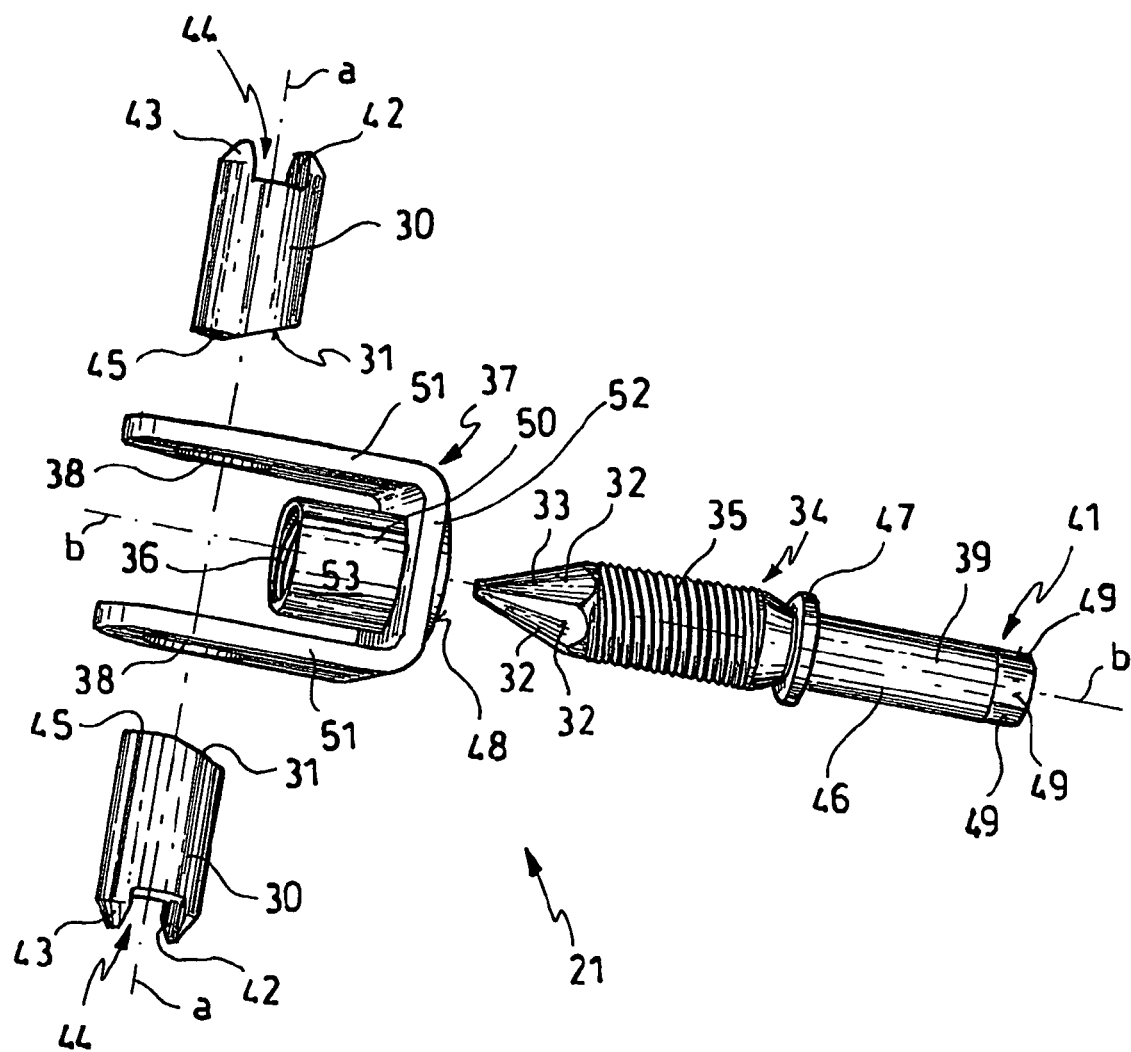
FIG. 7 is a perspective view of the device of FIG. 6 with parts separated.

Advantageously, the adjustment device comprises adjustment elements 30 each cooperating with one of the adjacent ends of the shoes 9. The adjustment elements 30 can be moved jointly in opposite directions so as to move the adjacent ends 19 of the shoes substantially towards one another or apart. The adjustment elements 30 comprise thrust surfaces 31 cooperating with opposed counter-thrust surfaces 32 of a pyramidal end 33 of an actuation element 34. The actuation element 34 has a threaded portion 35 housed rotatably in a threaded through-hole 36 of a support element 37 (FIG. 7). The threaded through-hole 36 is arranged substantially along an axis b-b transverse the axis a-a of the mutual separation and approach movement of the ends 19 of the shoes. The transverse axis b-b is preferably substantially parallel to the axis s-s of the braking surface of the drum, or brake axis or, more advantageously, is slightly inclined away from the axis s-s, to facilitate manipulation. The support element 37 also comprises support means 38 for slidably housing the adjustment elements 30 so as to form, with the actuation element 34, a support and thrust structure closed onto the opposed adjustment elements. The actuation element 34 also comprises an operating extension 39 which can be housed so as to float freely in a slot 40 provided in the shoe-holder plate 2 in manner such that an activation end 41 projects from the brake (FIGS. 4 and 5).

According to one embodiment, each of the adjustment elements 30 comprises a spacer which can abut the end 19 of the shoe 9 in order to transmit the tangential components of the braking force from one shoe to the other of the kinematic chain which is in abutment with the abutment element. In particular the spacer comprises an end portion 42 suitable for form coupling with the end portion of the shoe forming the seat 20. The portion 42 suitable for form coupling comprises a fork 43 forming a coupling seat 44 for the end portion of the rib 14 of the shoe 9 that forms the base of the seat 20 of the shoe.

According to one embodiment, each of the adjustment elements 30 comprises an end face 45 remote from the shoe 9 and having a portion which forms the thrust surface 31. The portion of the end face 45 forming the thrust surface 31 advantageously covers a fraction of the extent of the end face 45. For example, the thrust surface is slightly more than half of the extent of the end face, preferably a fraction of between 45% and 70% of the extent of the end face. Tests performed on the device have shown that an extent of between 60% and 65% of the end face and, in particular of 63% of the end face provides a strong thrust surface for withstanding and transmitting even the most severe braking forces. For example, for cylindrical spacer adjustment elements having an outside diameter of 13 mm, it has been found particularly advantageous to have a thrust surface which has an extent of 8.2 mm transverse the spacer.

Figure 8:
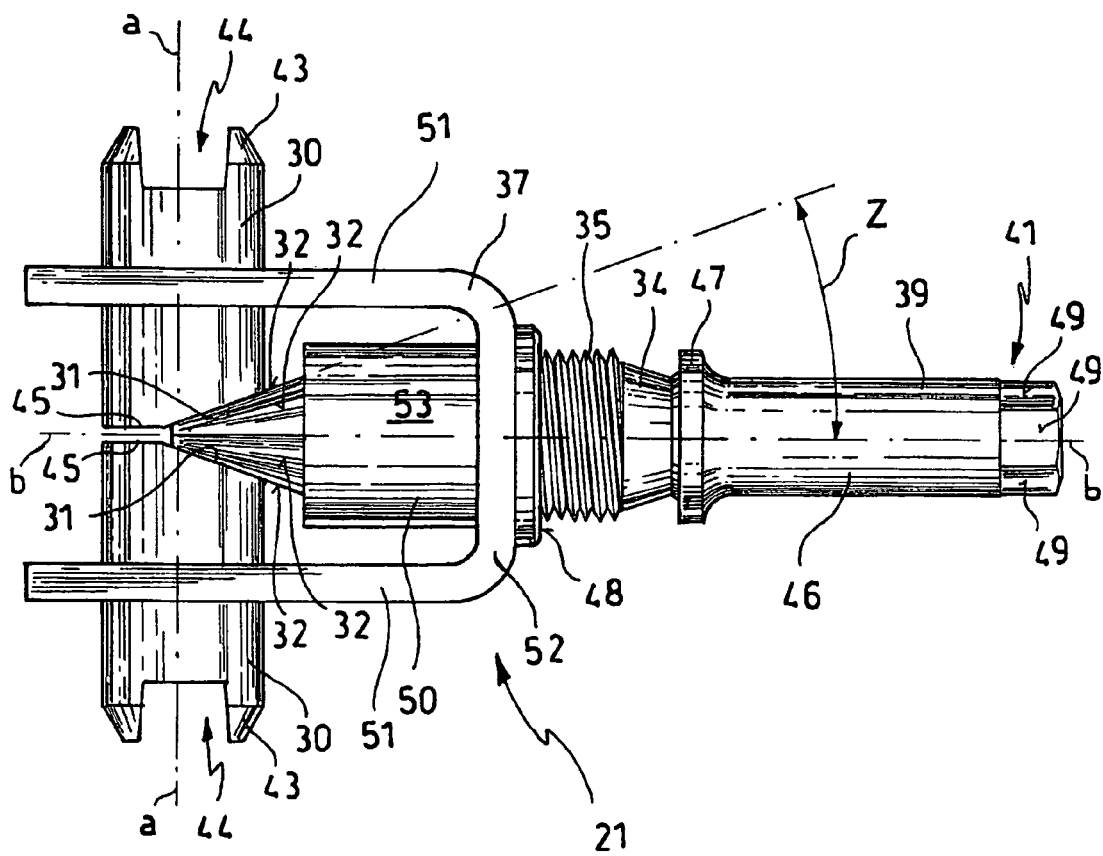
FIG. 8 is a view of the adjustment device of FIG. 6, substantially from above.

According to one embodiment, the portion forming the thrust surface is inclined to a plane transverse the adjustment element and parallel to the axis b-b of the actuation element, with a predetermined angle of inclination Z (FIG. 8). The portion forming the thrust surface is advantageously inclined to a plane transverse the adjustment element so as to transfer the force transmitted by the actuation element in a direction suitable for moving the ends of the shoes apart in order to take up the wear of the friction material. For example, the angle of inclination is between 10 degrees and 40 degrees and preferably between 15 degrees and 30 degrees. It has been found from tests carried out on the adjustment device that, with an angle of inclination Z of 20 degrees, highly accurate adjustment, as well as a more than adequate bearing surface, are achieved.

The adjustment elements 30 are arranged opposite one another so as to form, with their inclined thrust surfaces, a V-shaped seat for the pyramidal end 33 of the actuation element 34.

According to one embodiment, the actuation element 34 comprises the pyramidal end 33 defined by a plurality of counter-thrust surfaces 32 suitable for abutting the thrust surfaces 31 of the adjustment elements 30. The opposed surfaces of the pyramidal end 33 are inclined so as to be arranged parallel to the thrust surfaces facing them. The pyramidal end 33 advantageously comprises identical counter-thrust surfaces 32. For example, the pyramidal end 33 comprises six counter-thrust (or opposing thrust) surfaces 32. In particular, the formation of a pyramidal end with six counter-thrust surfaces has been found highly advantageous during tests since, in combination with the angle of inclination or aperture (twice Z) of the pyramidal end, this shape prevents excessively accentuated jumping of the spacer adjustment elements, biased by the spring acting between the ends 19 of the shoes, as they pass over the angles between two adjacent counter-thrust surfaces during the rotation of the actuation element. At the same time, this solution enables the counter-thrust surface to have an extent such as to withstand in an optimal manner the load generated by braking.

According to a further embodiment, the actuation element 34 comprises a body which extends substantially longitudinally with an axis b-b substantially transverse the axis a-a of the mutual approach or separation movement of the ends of the shoes. The body advantageously comprises an externally-threaded cylindrical portion 35 which can cooperate with the threaded through-hole 36 of the support element 37. With further advantage, the threaded portion 35 is provided in the vicinity of the pyramidal end 33. The threaded portion has an extent sufficient to allow the pyramidal end 33 to be inserted between the adjustment elements 30 in a manner such as to move the shoes 9 apart by a distance equal to the maximum wear of the friction material. It was found in tests carried out on the adjustment device that an M12×1.75 thread, in combination with the angle of inclination of the thrust and counter-thrust surfaces, as well as in combination with the number of counter-thrust surfaces of the pyramidal end, achieved optimal precision and safety in the adjustment of the distance between the ends of the shoes.

According to one embodiment, the actuation element 34 comprises a shank 46 of a length such as to allow an end 41 thereof remote from the pyramidal end 33 to project from the shoe-holder plate 2. The shank advantageously comprises an abutment element 47, for example, an annular rim or projection, which can abut a counter-abutment surface 48 provided in the support element 37. The abutment element defines the position of maximum insertion of the actuation element 34 between the adjustment elements 30.

According to yet a further embodiment, the actuation element 34 comprises an activation end 41 projecting from the brake and suitable for being operated by hand or by a tool for rotating the actuation element, advancing it or retracting it between the adjustment elements 30. For example, the activation end 41 comprises key or nut surfaces 49 for cooperating with a tool such as a wrench or spanner.

According to one embodiment, the support element 37 comprises a body provided with a support and guide 50 for the activation element 34 and fork-like arms 51 forming opposed support means 38 for the support and sliding of the adjustment elements 30. In particular, the body comprises a plate bent so as to be U-shaped, forming a base 52 comprising a threaded seat 36 for the actuation element 34 and two parallel arms 51 provided with through-holes 38 forming the means for the support and sliding of the adjustment elements 30. According to one embodiment, the base 52 comprises a cylindrical extension 53 provided with the threaded through-hole 36 for supporting and guiding the actuation element 34. According to a further embodiment, the cylindrical extension is formed by an internally threaded sleeve fixed by force-fitting or interference-fitting in a suitable hole provided in the base 52 of the body.

When the shoe brake is activated in order to brake the vehicle, the separator actuator moves apart the ends of the shoes which face it so that the shoes are pressed into contact with the braking surface of the brake drum. The frictional force which is developed between the shoes and the drum causes a first shoe (the shoe which is the first depends on the direction of rotation of the drum or on the direction of the force exerted by the drum on the shoes, if the drum is stationary) to press against the adjustment device which in turn presses against the second shoe, which is kept pressed into contact with the drum by the actuator. The drum in turn tends to rotate and the entire unit formed by the drum and the kinematic chain of the shoes, the actuator and the adjustment device, rotates until the bearing surface of the second shoe abuts the corresponding surface of the abutment element so as to develop the braking force.

As the thickness of the friction material of the shoes decreases or, in other words, as the shoes become worn, the travel of the separator actuator in order to place the shoes against the braking surface of the drum increases or, in other words, this travel of the separator actuator becomes excessive, requiring, for example, a large travel to operate the brake. In order to keep the travel within predetermined and low values, the shoes are moved apart by the adjustment device, moving the friction material remaining on the shoes towards the braking surface of the drum. This operation is usually performed during programmed maintenance of the vehicle and, by virtue of this adjustment device, is performed quickly but very precisely and safely.

If the activation end 41 of the actuation element which projects from the brake is rotated, for example, by coupling a spanner (a socket spanner or wrench) with the key surfaces 49 of the activation end 41, the actuation element is screwed into the threaded hole of the support element 37, bringing about an axial movement thereof. The pyramidal end 33 penetrates between the spacer adjustment elements 30, bringing successive faces 32 of the pyramid into abutment with the inclined thrust surfaces 31. The spacers are thus moved apart, moving the shoes apart precisely.

The constant force produced by the resilient means which bias the shoes acts on the spacers so as to bring the thrust surface into abutment with the counter-thrust surface of the pyramidal end. This force is discharged onto the pyramidal end by the adjustment elements, by means of the inclined thrust surfaces, and hence onto the actuator element, which discharges it onto the base of the support element, which discharges it transversely relative to the spacer adjustment elements, by means of the arms. This structure produces a closed force loop which leaves the adjustment device free to float, without needing to be restrained on separate supports such as the shoe-holder plate. In other words, the proposed adjustment device avoids the use of support elements on the shoe-holder plate.

The angle which delimits two adjacent counter-thrust surfaces of the pyramidal end advantageously prevents the biasing action on the shoes produced by the resilient means, together with stresses induced by the movement of the vehicle, from bringing about unscrewing of the actuator element.

As can be seen from the foregoing description, the adjustment device floats, together with the shoes, preventing obstruction of the correct operation of the dual-servo brake and at the same time, its activation end projects from the brake, facilitating precise, sensitive and safe operation thereof.

In this device, the cooperation between the support element, the adjustment elements, and the actuation element forms a closed structure in the working position or, in other words, a dynamically closed structure which does not discharge to the exterior the stresses which are directed transversely relative to the axis of the mutual separation or approach movement of the ends of the shoes, so that it does not require a further external structure such as the shoe-holder plate as a fixed support structure for the adjustment device.

Particularly advantageously, the adjustment device does not modify the precise working position set by the operator since, between counter-thrust surfaces, there is a position in which a further separation movement of the adjustment elements is imposed by the angle between adjacent faces of the pyramidal end.

The travel limit of the actuation element is advantageously set by the annular projection 47 which constitutes a safety abutment.

A further advantage is that the fork-like structure of the support element is simple and easy to produce. For example, it can be produced from a rectangular plate in which a hole is formed in the base portion. The plate is then bent so as to be U-shaped and aligned holes are formed in the ends. The threaded sleeve can then be fitted with force or with interference, ensuring perpendicularity between the axis a-a of the adjustment elements and the axis b-b of the actuation element.

The device proposed has spacer adjustment elements which are identical to one another and are easy to produce.

By virtue of the fact that only a portion of the end face of each adjustment element is inclined, a small and compact device is produced, so that the device can be fitted even in small brakes.

In order to satisfy contingent and specific requirements, a person skilled in the art may apply to the above-described preferred embodiment of the adjustment device many modifications, adaptations and replacements of elements with other functionally equivalent elements without, however, departing from the scope of the appended claims.

The invention claimed is:

1. An apparatus for applying force to an end portion of a rib of a brake shoe, said apparatus comprising: a U-shaped base, an adjustment element, and an actuation portion having an abutment surface and an externally threaded cylindrical portion:
   a. the adjustment element comprising:
      i. a first portion comprising an end face and a thrust surface wherein the thrust surface comprises 60%-65% of the surface area of the first portion and the end face comprises the remainder of the surface area of the first portion;
      ii. a second portion comprising a fork and a seat, said fork and seat receiving the end portion of the rib of the shoe; and
      iii. a cylindrical side surface disposed within a through-hole of the U-shaped base;
   b. the U-shaped base comprising:
      i. a bent plate having two parallel arms and a support element; each arm containing a through-hole capable of receiving the adjustment element; and said support element having an counter-abutment surface for contacting the abutment surface of the actuation portion; and
      ii. a cylindrical extension comprising a threaded hole for guiding the externally threaded cylindrical portion of the actuation portion; said cylindrical extension attached to the bent plate for guiding the actuation element into engagement with the thrust surface of the first portion;
   c. the actuation portion comprising: a pyramidal end, activation end, the externally threaded cylindrical portion, and the abutment surface;
      i. said pyramidal end comprising a plurality of counter-thrust surfaces structured to abut the thrust surface of the adjustment element;
      ii. said activation end comprising a set of key surfaces for interfacing with a socket spanner or wrench;
      iii. said abutment surface comprising an annual rim for abutting the counter-abutment surface connected to the support element of the bent plate; and
      iv. said externally threaded cylindrical portion comprising threads cooperatively engaged with the threaded hole for moving the pyramidal end of the actuation portion into engagement with the thrust surface of the engagement surface for causing the fork and the seat of the second portion to apply force to the end portion of the rib of the shoe.

2. The apparatus of claim 1, wherein the apparatus comprises two adjustment elements.

3. The apparatus of claim 1, wherein the adjustment element is disposed within the through-hole of the arm, and the actuation portion is disposed within the cylindrical extension.

4. The apparatus of claim 1 in which the adjustment element comprises a spacer.

5. The apparatus of claim 1 in which the spacer comprises a portion suitable for coupling with a portion of the shoe.

6. The apparatus of claim 1 in which the thrust surface is inclined at a predetermined angle of inclination to a plane transverse the thrust element.

7. The apparatus of claim 1 in which the thrust surface is inclined at an angle of 20 degrees.

8. The apparatus of claim 1 in which the thrust surface is inclined to a plane transverse the thrust element so as to transfer a force transmitted by the actuation element in a direction suitable for moving the ends of the shoes apart in order to take up the wear of the friction material.

9. The apparatus of claim 1 in which the adjust element is arranged opposite one another so as to form, with the inclined portions, a V-shaped seat for the pyramidal end of the actuation element.

10. An apparatus for applying force to an end portion of a rib of a brake shoe, said apparatus comprising: a U-shaped base, an adjustment element, and an actuation portion having an abutment surface and an externally threaded cylindrical portion:
   a. the adjustment element comprising:
      i. a first portion comprising an end face and a thrust surface wherein the thrust surface comprises a majority of the surface area of the first portion and the end face comprises the remainder of the surface area of the first portion;
      ii. a second portion comprising a fork and a seat, said fork and seat receiving the end portion of the rib of the shoe; and
      iii. a cylindrical side surface disposed within the U-shaped base;
   b. the U-shaped base comprising:
      i. a bent plate having two parallel arms and a support element; each arm containing a through-hole for receiving the adjustment element; and said support element having an counter-abutment surface for contacting the abutment surface of the actuation portion; and
      ii. a cylindrical extension comprising a threaded hole for guiding the externally threaded cylindrical portion of the actuation portion; said cylindrical extension attached to the bent plate for guiding the actuation element into engagement with the thrust surface of the first portion;
   c. the actuation portion comprising: a pyramidal end, activation end, the externally threaded cylindrical portion, and the abutment surface;
      i. said pyramidal end comprising a plurality of counter-thrust surfaces structured to abut the thrust surface of the adjustment element;
      ii. said activation end comprising a set of key surfaces for interfacing with a socket spanner or wrench;
      iii. said abutment surface comprising an annual rim for abutting the counter-abutment surface connected to the support element of the bent plate; and iv. said externally threaded cylindrical portion comprising threads cooperatively engaged with the threaded hole for moving the pyramidal end of the actuation portion into engagement with the thrust surface of the engagement surface for causing the fork and the seat of the second portion to apply force to the end portion of the rib of the shoe.

11. The apparatus of claim 10, wherein the apparatus comprises two adjustment elements.

12. The apparatus of claim 10, wherein the adjustment element is disposed within the through-hole of the arm, and the actuation portion is disposed within the cylindrical extension.

13. The apparatus of claim 10 in which the spacer comprises a portion suitable for coupling with a portion of the shoe.

14. The apparatus of claim 10 in which the thrust surface is inclined at a predetermined angle of inclination angle of inclination to a plane transverse the thrust element.

15. The apparatus of claim 10 in which the thrust surface is inclined at an angle of 20 degrees.

16. The apparatus of claim 10 in which the thrust surface is inclined to a plane transverse the thrust element so as to transfer a force transmitted by the actuation element in a direction suitable for moving the ends of the shoes apart in order to take up the wear of the friction material.

17. The apparatus of claim 10 in which the adjust element is arranged opposite one another so as to form, with the inclined portions, a V-shaped seat for the pyramidal end of the actuation element.

18. The apparatus of claim 10 in which the adjustment element comprises a spacer.

* * * * *